(12) United States Patent
Daniel et al.

(10) Patent No.: US 12,204,347 B2
(45) Date of Patent: Jan. 21, 2025

(54) SYSTEM AND METHOD FOR MANAGING MULTIPLE UAS PERFORMING AN ADAPTIVE MISSION

(71) Applicant: VHIVE TECH LTD., Hertzliya Pituach (IL)

(72) Inventors: Tomer Daniel, Givatayim (IL); Yariv Geller, Hertzliya (IL); Yoav Naveh, Bahan (IL)

(73) Assignee: VHIVE TECH LTD., Hertzliya Pituach (IL)

( * ) Notice: Subject to any disclaimer, the term of this patent is extended or adjusted under 35 U.S.C. 154(b) by 608 days.

(21) Appl. No.: 16/982,342

(22) PCT Filed: Mar. 20, 2019

(86) PCT No.: PCT/IL2019/050312
§ 371 (c)(1),
(2) Date: Sep. 18, 2020

(87) PCT Pub. No.: WO2019/180715
PCT Pub. Date: Sep. 26, 2019

(65) Prior Publication Data
US 2021/0034075 A1 Feb. 4, 2021

(30) Foreign Application Priority Data
Mar. 21, 2018 (IT) .................. 102018000003849

(51) Int. Cl.
*G05D 1/00* (2024.01)
*B64U 101/30* (2023.01)
(Continued)

(52) U.S. Cl.
CPC .......... *G05D 1/104* (2013.01); *G05D 1/1064* (2019.05); *G08G 5/0034* (2013.01);
(Continued)

(58) Field of Classification Search
None
See application file for complete search history.

(56) References Cited

U.S. PATENT DOCUMENTS 9,198,363 B2  12/2015  Vian et al.
9,632,502 B1  4/2017  Levinson et al.
(Continued)

FOREIGN PATENT DOCUMENTS

CN   105700553 A   6/2016
CN   106444845 A   2/2017
WO   2016/210156 A1   12/2016

OTHER PUBLICATIONS

Berger, Cyrille et al., "Area Coverage with Heterogeneous UAVs using Scan Patterns," 2016, 2016 IEEE International Symposium on Safety, Security, and Rescue Robotics (SSRR), Lausanne, Switzerland, pp. 342-349 (Year: 2016).*

*Primary Examiner* — Aniss Chad
*Assistant Examiner* — Madison R. Inserra
(74) *Attorney, Agent, or Firm* — NKL Law; Jae Youn Kim

(57) ABSTRACT

A computerized system and method for managing a fleet of Unmanned Aerial Systems (UAS) collaboratively performing a mission. The system receives mission requirements comprising mission goals, area of operation, characteristics of each UAS and calculates data acquisition points in the area of operation according to mission goals, sensor types and constraints. It then calculates a flight plan for each UAS. Once flying in the field, the system verifies for each UAS at predetermined intervals during flight the UAS' aerial location at that time and compares the UAS aerial location to the expected aerial location according to flight plan in that time. If necessary, adjustments are made to the flight plan of one
(Continued)

or more UAS. Other considerations for flight adjustments are battery power level, mission goal accomplishments, signal quality and more.

13 Claims, 2 Drawing Sheets

(51) Int. Cl.
    *G08G 5/00*           (2006.01)
    *G06Q 10/04*         (2023.01)
    *G06Q 10/047*      (2023.01)

(52) U.S. Cl.
    CPC ....... *G08G 5/0069* (2013.01); *B64U 2101/30* (2023.01); *B64U 2201/10* (2023.01); *B64U 2201/102* (2023.01); *B64U 2201/20* (2023.01)

(56) References Cited

U.S. PATENT DOCUMENTS

| | | | |
|---|---|---|---|
| 10,909,859 B1 * | 2/2021 | Dodd | G07C 5/0816 |
| 2015/0336669 A1 * | 11/2015 | Kantor | B64U 50/35 |
| | | | 701/3 |
| 2017/0081026 A1 | 3/2017 | Winn et al. | |
| 2018/0004207 A1 * | 1/2018 | Michini | G05D 1/0088 |
| 2018/0004231 A1 | 1/2018 | Michini et al. | |
| 2018/0079530 A1 * | 3/2018 | Wyrobek | B64F 1/0297 |
| 2018/0188747 A1 * | 7/2018 | Venturelli | G06Q 10/06311 |
| 2019/0150167 A1 * | 5/2019 | Lee | B60L 53/68 |
| | | | 705/7.24 |
| 2019/0384279 A1 * | 12/2019 | Song | H04W 36/165 |
| 2020/0050189 A1 * | 2/2020 | Gu | G08G 5/0069 |

\* cited by examiner

SYSTEM AND METHOD FOR MANAGING MULTIPLE UAS PERFORMING AN ADAPTIVE MISSION

TECHNICAL FIELD

The present invention relates to system and method for managing a plurality of Unmanned Aerial Systems (UAS) in general, and in particular to managing a plurality of UAS performing an adaptive mission.

BACKGROUND ART

Unmanned Aerial Systems (UAS) perform a wide variety of tasks, including mapping, reconnaissance, range finding, target location, combat, ordinance destruction, and sample collection. The use of unmanned vehicles conventionally involves an operator who typically brings the UAS to the launch location and prepares them for flight. The flight path can be entirely controlled by the operator or preprogrammed or both, for example, a preprogrammed flight which an operator can change and/or override.

When a plurality of UAS are in a location in order to perform a given task, it is best to plan ahead the division of labor between the different UAS. Thus, there's a need in the industry for a system that can plan and calculate in advance the individual mission and flight path of each UAS in an efficient way and also handle unexpected conditions and UAS behavior once in the field.

SUMMARY OF INVENTION

It is an object of the present invention to provide a system and method for planning and operating a plurality of UAS in a data collection mission in an efficient, safe and autonomous way.

It is another object of the present invention to provide a system and method for planning and operating a mission for a plurality of UAS taking into account the mission type, region of interest and required image resolution.

It is further object of the present invention to provide a system and method for planning and operating a mission for a plurality of UAS taking into account each UAS sensors' capabilities and each UAS flight capabilities.

It is yet another object of the present invention to provide a system and method for planning and operating a mission for a plurality of UAS taking into account constraint definitions such as no-flight-zones and legal regulations.

It is yet a further object of the present invention to provide a system and method for planning and operating a mission for a plurality of UAS and adapting the UAS flight plans according to unexpected field conditions.

It is yet another object of the present invention to provide a system and method for planning and operating a mission for a plurality of UAS and adapting the UAS flight plans according to unexpected flight performance.

The present invention relates to a computing system comprising at least one processor; and at least one memory communicatively coupled to the at least one processor comprising computer-readable instructions that when executed by the at least one processor cause the computing system to implement a method of managing a fleet of UAS collaboratively performing a mission, the method comprising:
(i) receiving mission requirements comprising mission goals, area of operation, characteristics of each UAS;
(ii) calculating data acquisition points in the area of operation according to mission goals, sensor types and constraints;
(iii) calculating a flight plan for each UAS, each flight plan comprising one or more routes and UAS speed values for each route or for each segment of a route;
(iv) for each calculated flight plan, assigning each route or segment of a route a maximum position discrepancy tolerance value, said position discrepancy tolerance value being based on location and time discrepancy between the UAS expected position according to the flight plan and its actual position;
(v) verifying for each UAS at predetermined intervals during flight the UAS' aerial location at that time; and
(vi) comparing the UAS aerial location to expected aerial location according to flight plan in that time; and
(vii) recalculating the flight plan of all the UAS of the fleet if the discrepancy between the aerial location values read in (v) and the expected aerial location values according the flight plan exceed the assigned maximum position discrepancy tolerance value.

In some embodiments, the system further comprises the step of calculating a plurality of discrete geographic cells to cover all data acquisition points, each cell covering at least one data acquisition point.

In some embodiments, the system further comprises the step of verifying for each UAS at predetermined intervals during flight the UAS' power supply status.

In some embodiments, the system further comprises the step of verifying for each UAS at predetermined intervals during flight during flight the UAS' mission goals accomplishments status, for example, verifying image quality of images (all or samples) taken by the UAS In some embodiments, the system further comprises the step of verifying for each UAS at predetermined intervals during flight the signal quality from the UAS to the operator.

In some embodiments, the flight plan of one or more UAS can be modified according to one or more unexpected changes to a UAS power supply status, number of operational UAS, line of sight (LOS) between a UAS and its operator, safe return to home (RTH) path, condition of launch point, condition of landing point, or remote-control signal quality.

In another aspect, the present invention relates to a computerized method for managing a plurality of Unmanned Aerial Systems (UAS) performing a mission, the method comprising:
(i) receiving mission requirements comprising mission goals, area of operation, characteristics of each UAS;
(ii) calculating data acquisition points in said area of operation according to mission goals, sensor types and constraints;
(iii) calculating a flight plan for each UAS, each flight plan comprising one or more routes and UAS speed values for each route or for each segment of a route;
(iv) verifying for each UAS at predetermined intervals during flight the UAS' aerial location at that time; and
(v) comparing said UAS aerial location to expected aerial location according to flight plan in said time; and
(vi) adjusting the flight plan of one or more UAS if the discrepancy between the aerial location values read in (iv) and the expected aerial location values according the flight plan exceed a predetermined range.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized, and structural changes may be made without departing from the scope of the present invention.

The present invention relates to a computing system running software instructions to implement a method of managing a fleet of Unmanned Aerial Systems (UAS) collaboratively performing an adaptive mission. The term "fleet" refers to a plurality of UAS that can be of different types, models and owners. All the UAS collaborate together to perform a given mission.

Figure 1:
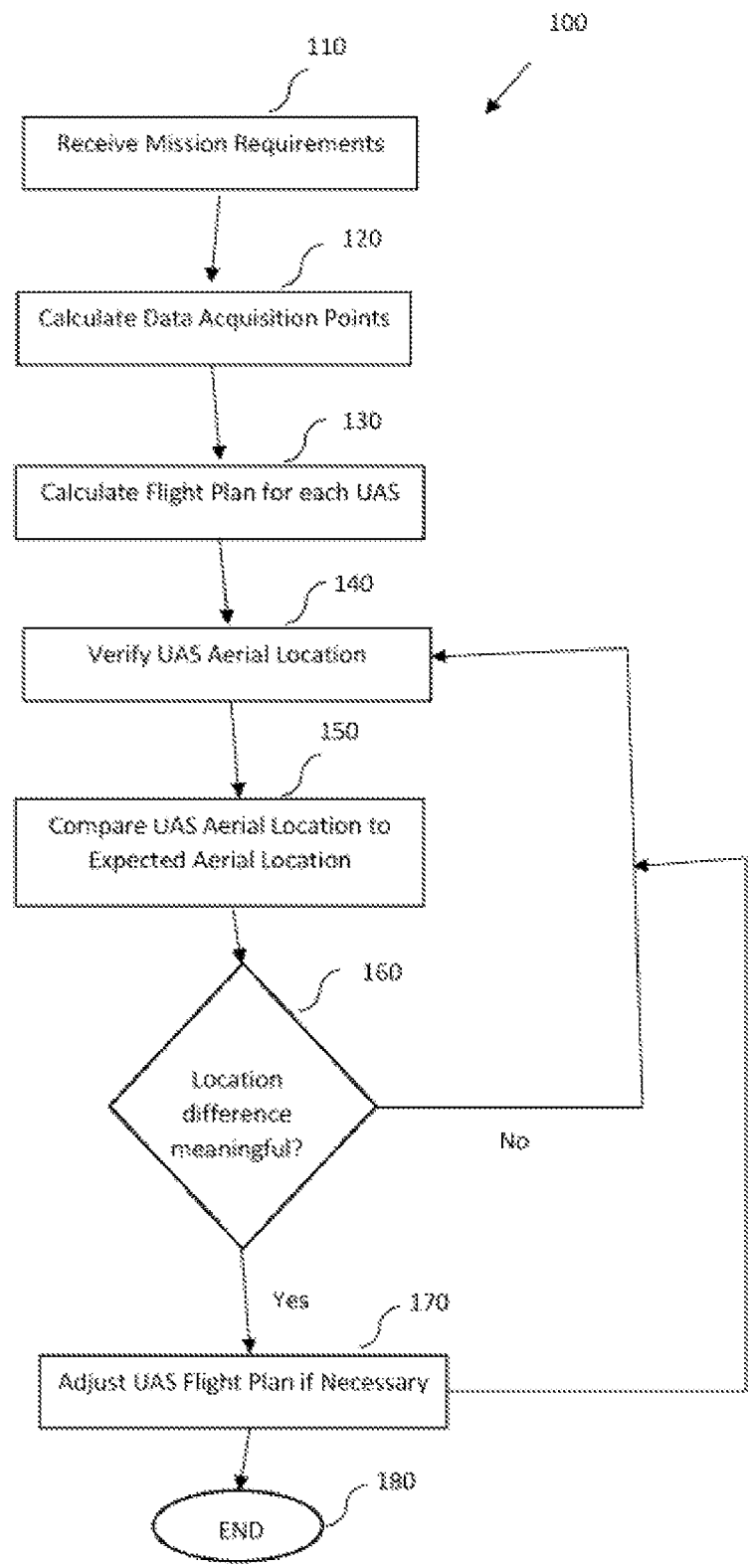
FIG. 1 is a flowchart of a method of adaptive management of UAS in a mission, according to an embodiment of the present invention.

Reference is now made to FIG. 1 showing a method of adaptive management of UAS in a mission, according to an embodiment of the present invention. In step 100 the method starts. First, in step 110 the system receives the mission requirements to be performed. The mission requirements can include mission goal, type, area of operation, and the characteristics of each UAS.

UAS mission types can vary, for example, aerial survey, identifying and finding objects of interest. For clarity purposes, aerial survey examples will be discussed in detail hereinbelow, though it should be evident for a person skilled in the art to adapt the disclosure to other mission types.

Aerial survey missions can be of different types, comprising:
- Area—cover a 2-dimensional (2D) area and generate an orthophotograph of the area. An orthophotograph is an aerial photograph geometrically corrected ("orthorectified") such that the scale is uniform: the photo has the same lack of distortion as a map. Unlike an uncorrected aerial photograph, an orthophotograph can be used to measure true distances, because it is an accurate representation of the Earth's surface, having been adjusted.
- Structure—cover a 3-dimensional (3D) structure from several angles and generate a details 3D model in one or more formats. Many techniques and technologies are known in the art to generate a 3D model based on different photographs of the structure, for example, using Structure for Motion (SFM).
- Linear—cover a linear path such as roads, pipes or perimeters in order to perform an inspection. The linear path may not be necessarily a straight line, but rather an elongated, narrow shape for the UAS to follow.
- Point—cover multiple distinct "points of interest" (POI) to allow an inspection of these points only. A point inspection saves time and processing, as only relevant data is collected. POI's are non-contiguous, as opposed to a structure. A POI may be a collection of structures.

The mission requirements include information about the area of operation. The area of operation comprises information about the area's topology, geometrical shape, obstacles, regulatory information (such as no-fly zones, noise constraints), climate conditions (wind conditions, rain prediction etc.), estimated sun position and any other required or useful information available about the area.

The system can manage a fleet (group) of UAS that collaborate to work together as a single, coordinated system, each UAS performing a portion of the given mission. The group can be composed of UAS with different individual characteristics that need to be taken in consideration when planning the overall mission and the assignments for each UAS.

The characteristics for each UAS can include (but are not limited to):
- Battery or power capacity, which determines the available flight time for each UAS. UAS are typically powered by rechargeable batteries but may be powered by alternative power sources as available in the industry.
- Imaging technology (sensors) installed:
  - RGB sensor—a regular camera, allows surveying and inspection;
  - FLIR—Forward Looking InfraRed camera or Thermal imaging camera, allows the user to quickly identify the range of different heat signatures being given off at the chosen survey area;
  - Multi-spectral camera, allows to identify plant stress factors, soil types, fertilizers, or insecticides; differentiate plant species or recognizes other plants, soils or chemicals;
  - LIDAR—Light Detection and Ranging (Lidar) is a remote sensing technology where the environment is usually scanned with a pulsed laser beam and the reflection time of the signal from the object back to the detector is measured. Allows Ground and Above Ground survey and inspection (Topography), and Structural Inspection.
- Speed and acceleration characteristics;
- Cargo carrying capacity in terms of size and weight;
- Communication capabilities; range, frequency (i.e. some UAS can function as a communication relay for other UAS)

After receiving the mission requirements and assessing each UAS' characteristics and capabilities, the next step is calculating data acquisition points in the area of operation according to mission goals, sensor types, UAS flight capabilities and known constraints in step 120.

The required output of aerial survey is typically an orthophotograph or a 3D model of the area of operation. In both cases, photogrammetry plays an important role, and dictates much of the requirements and constraints regarding the images that are taken (captured) during the mission. In order to get high accuracy results from the photogrammetry software, a high overlap between the images is useful. Therefore, the image acquisition plan is carefully designed in order to have at least the required overlap. The image acquisition plan depends on the required Ground Sampling Distance (GSD) by the project specifications and the terrain type/object to be reconstructed. A deficient image acquisition plan will lead to inaccurate results or processing failure and may require additional image acquisition.

When designing the image acquisition plan, at least the following factors need to be taken into consideration:
- Image acquisition plan type: the image acquisition plan type depends on the type of terrain/object to be reconstructed;
- Ground Sampling Distance (GSD): The required GSD by the project specifications will define the distance (flight height) at which the images need to be taken; and
- Overlap: The overlap depends on the type of terrain that is mapped and will determine the rate at which the images have to be taken.

In order to calculate data acquisition points for capturing the required images to fulfil the given mission, data acquisition building takes the requirements and restrictions into account and produces an optimal set of points in space, together with the needed camera position at these points, in order to be able to capture the required images. Optimality means to plan the minimum number of points (and also the minimum number of image captures) that will produce high quality results or results that fulfil the mission requirements. The data acquisition algorithm takes into account sensor characteristics, the target area geometrical shape, and possibly additional constraints such as no-flight zone, Line of sight (LOS) and obstacle avoidance.

A large area mission very typically needs to be decomposed into smaller areas called cells. This is necessary since each UAS is able to cover/process only a limited area due to battery/power limitations. An entire mission can be described as a set of points (physical positions in a 3D space) that a UAS needs to visit. For each point, a list of actions is defined for the UAS to perform (for example, take a picture at a specified angle with specific image characteristics). The points' locations are determined by the Region of Interest (ROI) defined by the user, the target resolution of the output, and the photogrammetry requirements.

A cell is a subset of the mission points (with their associated actions), and a cell decomposition (or cellular decomposition) is a partition of the mission points into several subsets. Each cell has at least one data acquisition point.

A good or optimal cells decomposition is a partition that minimizes the overall mission time. Possible criteria for optimality are:
1. Equal cell size—cells that are too large are more difficult to cover/process by a set of UAS taking off from a single launch point. Cells that are too small are not efficient (getting into a new launch point and preparing a group of UAS for flight takes time).
2. Minimum number of cells—getting into a new launch point and preparing a group of UAS for flight takes time, and thus should be minimized.
3. Specific cell shape—some shapes allow for a more efficient flight paths to be calculated. For example, cells that are very narrow cannot be processed simultaneously by a set of UAS taking off from a single launch point, as UAS needs to be spaced apart to avoid collisions.
4. Safety—partition into cells that will create maximum spatial separation between UAS is advantageous.

Different algorithms can be used in order to generate cellular decomposition. Following are a few examples though a person skilled in the art will know how to use alternative algorithms too. Some examples are:
1. Partition into equal size (large) rectangles that cover the entire mission point set.
2. Finding the minimum number of rectangles that cover the entire mission point set using constrained programming techniques. To solve such a problem, one needs to:
   a. Define the set of variables—for example, the x and y coordinates of the bottom left corner of each rectangle; the height and width of each rectangle;
   b. Define a set of constraints—for example, the height and width of each rectangle needs to be within a certain interval; rectangles cannot overlap;
   c. Define the optimization criteria—for example, minimizing the number of rectangles.
3. Clustering algorithms—partition the mission points into N subsets by using clustering algorithms of the art like K-means. Additional constraints can be added to control the sizes of the resulting clusters.
4. Voronoi based algorithms—Voronoi diagram is a partition of the plane into regions according to an input set of sites. The points in each planar region define a cell. There are constrained or weighted versions of Voronoi diagram algorithms that allow to have some control over the size of the different regions. Cell sizes of roughly the same size are typically used to maintain reasonable load balance on the operating UAS After calculating data acquisition points, it is necessary to calculate a flight plan for each UAS in step 130, each flight plan comprising one or more flight routes and UAS speed values for each route or for each segment of a route.

In order to calculate a flight plan for each UAS, algorithms for solving discrete optimization problems can be used. Algorithms for solving discrete optimization problems can be divided into two categories:
1. Complete/exact algorithms—the optimal solution is guaranteed;
2. Approximate algorithms—approximate solution is found. Sometimes, it can be guaranteed to be within a known neighborhood of the optimal solution.
   Complete (exact) algorithms involve systematic search of the solution domain space. In this case, the domain of all permutations of the points in P. This can be a huge space, even for problems of a few hundreds of points, and the problem is known to be NP hard. There are general techniques to handle such problems (in exponential run time complexity) like:
1. Constraint programming (see more details above)
2. Dynamic programming—using divide and conquer strategy to avoid recomputing sub problems.
3. Mixed integer programming.

There are many approximate algorithms to this problem:
1. Heuristic approaches—heuristic search;
a. Constructive methods: construct solutions from partial solutions;
b. Local search: improve solutions through neighborhood search;
c. Metaheuristics: Combine basic heuristics in higher-level frameworks;
2. Polynomial-time approximation algorithms for NP-hard problems; and
3. Path coverage algorithms—these algorithms, considering specifically the problem of covering an area or a set of points by UASs, take advantage over the regular nature of the set of points or the coverage pattern of the area.

There are many approximate algorithms to this problem.
1. Heuristic approaches—heuristic search
   a. Constructive methods: construct solutions from partial solutions
   b. Local search: improve solutions through neighborhood search
   c. Metaheuristics: Combine basic heuristics in higher-level frameworks
2. Polynomial-time approximation algorithms for NP-hard problems
3. Path coverage algorithms—these algorithms, considering specifically the problem of covering an area or a set of points by UAVs, take advantage over the regular nature of the set of points or the coverage pattern of the area.

Approximate algorithms in more detail:
1. The nearest neighbor (NN) algorithm (a greedy algorithm) lets the salesman choose the nearest unvisited city as his next move. This algorithm quickly yields an effectively short route. For N cities randomly distributed on a plane, the algorithm on average yields a path 25% longer than the shortest possible path
2. The Christofides algorithm follows a similar outline but combines the minimum spanning tree with a solution of another problem, minimum-weight perfect matching. This gives a Travelling Sales Person (TSP) tour which is at most 1.5 times the optimal.
3. K-opt heuristic, or Lin-Kernighan heuristics: Take a given tour and delete k mutually disjoint edges. Reassemble the remaining fragments into a tour, leaving no disjoint subtours (that is, don't connect a fragment's endpoints together). Such a constrained 2k-city TSP can then be solved with brute force methods to find the least-cost recombination of the original fragments. The most popular of the k-opt methods are 3-opt.
4. Divide and merge: partition the whole problem into smaller sub problems, solve each subproblem separately, and combine the resulting sub-paths into a valid global path. The subproblems are easier to solve because they are smaller, and sometimes have simpler structure than the original problem.
5. Ant colony optimization: the system sends out a large number of virtual ant agents to explore many possible routes on the map. Each ant probabilistically chooses the next city to visit based on a heuristic combining the distance to the city and the amount of virtual pheromone deposited on the edge to the city. The ants explore, depositing pheromone on each edge that they cross, until they have all completed a tour. At this point the ant which completed the shortest tour deposits virtual pheromone along its complete tour route (global trail updating). The amount of pheromone deposited is inversely proportional to the tour length: the shorter the tour, the more it deposits.
6. Path coverage algorithms: Typically, 2-stage algorithms. First, they subdivide the target area into smaller, less complex sub-areas. Second, each sub-area is covered using one of the simple sweep patterns like the Lawnmower pattern. The entire area is then covered by visiting and covering all the subareas. These algorithms also take into account additional constraints depending on the aircraft's flight capabilities, namely its maximal flight duration and maneuvering capabilities.
a. The naive exact decomposition planner employs a simplistic approach of subdividing the concave polygon area into a set of convex cells regardless of their other geometric properties. Each of these cells is covered using the Lawnmower pattern with the leading direction perpendicular to its polygon width to minimize the number of turns. The overall visiting order is determined by greedy search based on cell's proximity to UAV's actual position.
b. The Enhanced exact cellular decomposition approach (EECD), takes into account the geometrical properties of the resulting set of cells when applying polygon subdivision. To ensure that this set is more favorable for the sweep, a new cutting technique that produces cells with dominant directions is presented. The algorithm considers all the concave vertices present in the current part of the polygon and tries cutting from all of them in the directions of all border lines. For each cut, the sum of polygon widths of the resulting pair of cells is computed. After all the possible cuts are computed, the subdividing algorithm performs the one with the minimal sum. This process is repeated until all the concave vertices are resolved. Each cell is then covered by the Lawnmower pattern.
c. Energy-aware path planner employs the Lawnmower pattern to sweep the entire area. The main difference from other algorithms discussed here is that it does not analyze the area in advance in the depth others do. In order to use the Lawnmower pattern, a leading direction has to be chosen. The presented approach chooses it simply by finding the area's longest borderline with the leading direction setting parallel to that. While traversing along the border, the following approach to cover all the neighboring area is used. The UAV travels not only the path determined by adjacent vertices distance $|v\ i-v\ j|$, but also the adjustment dependent on the slope of the next borderline. The flight stripe gets covered by photos taken from several specific locations. Since the aim is to reduce unnecessary coverage of the outlying area, waypoints enclosing the stripe on both sides are placed in the full distance from the area's border, i.e. L/2 (L is the step between pictures). To fully cover the rest of the stripe with the desired forward overlap, the distance between the boundary points is evenly distributed among the m inner waypoints.

The flight plan assigns each UAS the flight path, speed and height it should take in every route (or segment of a route) to perform its part in the mission. The flight plan attempts to take into consideration all the characteristics of the UAS (type, speed, power, battery status, maneuvering capabilities etc.) and environmental conditions such as weather conditions including wind status.

In reality, the UAS may not always be able to follow the flight plan precisely, due to a variety of reasons such as the battery might deplete faster than expected, the actual weight of the UAS might be different than planned (added accessories might be heavier or lighter than planned), the wind might change unexpectedly etc. As a result, it is necessary to verify during flight that the UAS is able to follow the assigned flight plan, and if there is an unexpected discrepancy than take corrective measures.

For each calculated flight plan, the system assigns each route or segment of a route a maximum position discrepancy tolerance value. The maximum position discrepancy tolerance value is based on location and time between the UAS expected position at a given time according to the flight plan and its actual measured position at that time. The assumption is that in the majority of cases, the UAS will always remain on the assigned route (flying by GPS, autocorrection for wind effects), but the speed of advancing may be delayed (or in some cases advanced) due to unexpected wind conditions, battery power considerations and also unexpected flight changes of other UAS that might affect the current flight path of the UAS in question, for example, another UAS which needs to return to base earlier and thus the actual UAS needing to slow down to allow the other UAS to pass by safely. The maximum position discrepancy tolerance value can be expressed in different ways, including:

(1) Distance units—the discrepancy at a given time between the expected position according to the flight plan (coordinates x1, y1, z1 at time t1) and the actual measured position (coordinates x2, y2, z2 at the same time t1). If at time t1, the UAS is not at position x1, y1, z1 as expected, the discrepancy can be expressed in distance units between (x1, y1, z1) and (x2, y2, z2), for example, 12 meters. The actual discrepancy may be calculated either as a straight line between the two points or by the actual path the UAS was supposed to follow between the two points, for example, a curved line (or any other non-straight path).

(2) Time units—the discrepancy at a given position between the time the UAS has arrived at that position (reaching point x1, y1, z1 at time t1) and the expected time it should have arrived at that point according to the flight plan (reached point x1, y1, z1 at time t2). If the UAS has reached point x1, y1, z1 at a time t1 which is different than the expected time t2, the discrepancy can be expressed in time units as t2−t1, for example, 7 seconds. Whenever the difference between the actual position of the UAS and the expected position of the UAS exceeds the assigned maximum position discrepancy tolerance value, the flights plans are recalculated for all the UAS of the fleet since all the UAS work collaboratively for one mission.

Once the UAS are launched and start their flight paths, it is necessary to perform controls to verify that everything is going according to plan, and if there are discrepancies to decide on a plan of action to adjust (or decide not to react).

The system verifies for each UAS at predetermined intervals during flight the UAS' aerial location at that time in step 140. Interval length may vary from sub-seconds to a few minutes (from 0.5-2 seconds to 5-10 minutes) and can be any length decided by the system planner or operator. When a flight plan is assigned to a UAS, the system also decides on the speed of the UAS at each point in time. Hence, once the UAS starts its flight, it follows the assigned flight plan, but may actually travel slower or faster than expected, most likely because of wind conditions on the field. At predetermined intervals, in step 150, the system checks on the UAS aerial location (X,Y,Z coordinates) and compares the UAS actual aerial location on the flight path to the expected location on the flight path. The discrepancy (if exists) can also be measured in time units, the difference between the time the UAS was supposed to reach a point and the time it actually got there. For example, assuming strong frontal winds that slow the UAS, the system can see that the UAS has reached a location say 4 seconds later than scheduled, since the UAS did not travel at the expected speed.

in step 160 the system verifies if the discrepancy between the aerial location values read (received) and the expected aerial location values according the flight plan is meaningful, that is exceed a predetermined range. If the location discrepancy is not meaningful (less than a predetermined value) the system takes no action and goes back to step 140 to verify the UAS location at the next scheduled time. If the location discrepancy is meaningful (more than a predetermined value) the system checks in step 170 if the flight plan of the UAS and/or one or more other UAS needs to be adjusted.

Adjustments to the flight plan of one or more UAS can be necessary due to various reasons such as:

The battery (power supply) of one or more UAS is not as expected, for example, battery has depleted much faster than planned and the UAS should come back to the landing point faster than planned. Other UAS should cover for the UAS landing sooner than expected.

A UAS may have a malfunction or may not be operational for any reason, hence the mission of such UAS should be redistributed to the remaining UAS.

Planned launch/landing points may need to be readjusted once on the field. For example, a planned launch point is hard to reach because of unexpected flooding, dangerous wind conditions, road blockage etc.

The Line of Sight (LOS) to the operator may be blocked either by the surveyed object or unexpectedly (trees have fallen, a truck is parked . . . ) hence flight path or landing/launch point may need to be readjusted.

The safe Return to Home (RTH) needs to be changed because unexpected conditions in the field/

Remote-control signal quality is not as expected, and adjustments should be made. For example, if the signal is weaker than expected, then maybe the UAS cannot fly too far away from the remote-control location.

Field conditions, such as an unexpected strong wind, may prohibit the UAS from completing the entire mission (more power is used against the stronger wind, hence battery will last less than scheduled). The system will then recalculate flight plans to cover less points, and to make the coverage more homogenous, such that all the remaining points (not covered now) will be close by and easier to cover at a later stage. If the targets were not redistributed, it could be, for example, that 10 points would remain over a distance of 2 kilometers, as opposed to after recalculations, 8 points would remain but over a distance of 300 meters. The remaining points would be easier to cover even in cases where there would be more points (12 for example) remaining uncovered.

Clear Return to Home (RTH) path—A UAS might have been launched earlier than scheduled meaning it would need to return to base earlier than scheduled. It's RTH path might then cross the path of other UAS (as it was originally scheduled to take the RTH path later), thus the flight plan may need to be recalculated for all the UAS.

Adding a UAS—During the mission a UAS might be added to fleet, for different reasons. For example, the UAS might arrive late to the location (traffic jams for the transporting vehicle), there might be a malfunction at the UAS that took some time repair thus delaying its launch, a UAS may malfunction and needs to be replaced, etc. Thus when adding a UAS, the flight plan (for the entire fleet) is recalculated.

In step 180 the UAS have finished their mission and have all landed.

Figure 2:
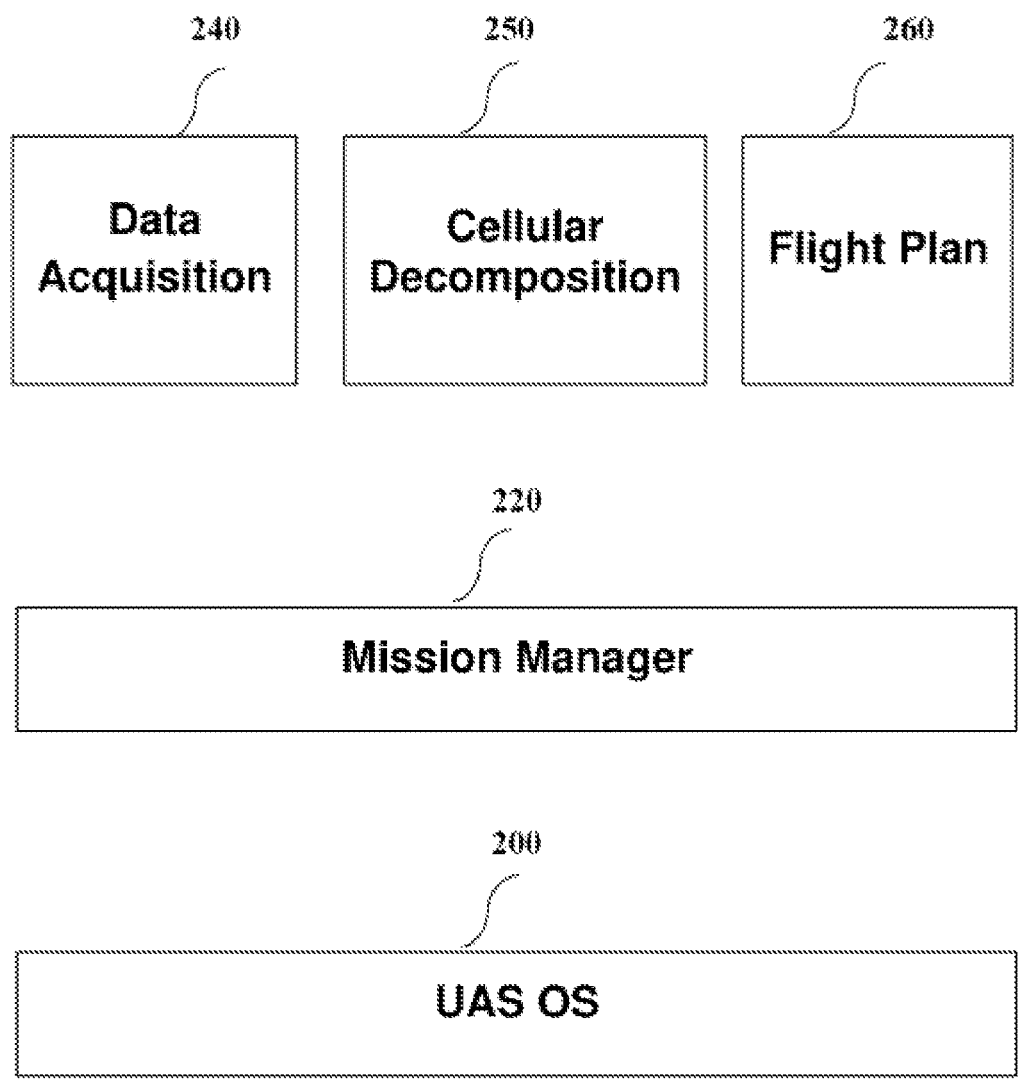
FIG. 2 is a block diagram of a system for adaptive management of UAS in a mission, according to an embodiment of the present invention.

Reference is now made to FIG. 2 showing a block diagram of a system for adaptive management of UAS in a mission, according to an embodiment of the present invention.

The invention provides a UAS operating system (OS) 200 that is an abstraction layer to manage all UAS operations in the field. The UAS OS 200 enables its users to use UAS operating commands such as launch, land, collect information, send flight plan, change flight plan, collect telemetry information, manipulate UAS equipment and the like. The UAS OS 200 user can use such commands without worrying about the actual implementation to send the commands to each specific UAS in the field.

The UAS OS 200 comprises a Mission Manager 220 software module that manages all calculations and operations for a given mission. The Mission Manager 220 makes all logic decisions on the mission level, for example, decide on the number of cells, define the global optimization criteria (i.e. cost function) etc. The Mission Manager 220 also records global mission progress.

Underneath the Mission Manager 220 module, there are a Data Acquisition 240 software module, a Cellular Decomposition 250 software module and a Flight Plan 260 software module.

The Data Acquisition 240 software module calculates exact data acquisition points according to mission goals, sensor types and constraints as described above.

The Cellular Decomposition 250 software module decomposes an entire mission's data acquisition plan into discrete cells. Each cell is expected to be served by a single launch point and one or more UAS. Different cells are either served in parallel by different UAS groups, or sequentially by a single UAS group hopping around as described above.

The Flight Plan 260 software module calculates flight plans for a UAS fleet, covering all data acquisition points in cell, according to each UAS capabilities in an optimal way (i.e. shortest path).

Although the invention has been described in detail, nevertheless changes and modifications, which do not depart from the teachings of the present invention, will be evident to those skilled in the art. Such changes and modifications are deemed to come within the purview of the present invention and the appended claims.

It will be readily apparent that the various methods and algorithms described herein may be implemented by, e.g., appropriately programmed general purpose computers and computing devices. Typically, a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth®, TDMA, CDMA, 3G.)

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The invention claimed is:

1. A computing system comprising:
at least one processor; and
at least one memory communicatively coupled to the at least one processor comprising computer-readable instructions that when executed by the at least one processor cause the computing system to implement a method of managing a fleet of Unmanned Aerial Systems (UASs) collaboratively performing a mission, the method comprising:
(i) receiving mission requirements comprising mission goals, area of operation, and characteristics of each UAS comprising at least sensor types and constraints of each UAS, said UASs collaborating to work together as a single, coordinated system, each UAS performing a portion of said mission;
(ii) calculating data acquisition points in said area of operation according to the mission goals, sensor types and constraints;
(iii) calculating a plurality of discrete geographic cells to cover the data acquisition points, each cell covering at least one data acquisition point and served by one or more UAS, wherein at least a portion of the cells are served in parallel by different UAS's and at least one cell is different in size and shape from the other cells;
(iv) calculating a flight plan for each UAS, each flight plan comprising one or more routes and UAS speed values for each route or for each segment of a route;
for each calculated flight plan, assigning to each route or segment of a route a maximum position discrepancy tolerance value, said position discrepancy tolerance value being based on location and time discrepancies between the UAS expected position according to the flight plan and its actual position;
(vi) verifying for each UAS, at predetermined intervals during flight, the UAS's aerial location at that time, wherein the flight plan of one or more UAS can be modified according to unexpected changes to the UAS's safe return to home (RTH) path because of unexpected conditions in the field;
(vii) comparing each UAS's aerial location to an expected aerial location according to the flight plan at said time; and
(viii) recalculating the flight plan of all the UASs of the fleet, if the discrepancy between the aerial location verified in (vi) and the expected aerial location according to the flight plan exceeds the assigned maximum position discrepancy tolerance value.

2. The computing system according to claim 1, wherein the method further comprises the step of verifying for each UAS at predetermined intervals during flight the UAS' power supply status.

3. The computing system according to claim 1, wherein the method further comprises the step of verifying for each UAS at predetermined intervals during flight the UAS' mission goals accomplishments status.

4. The computing system according to claim 1, wherein the method further comprises the step of verifying for each UAS at predetermined intervals during flight a signal quality from the UAS to an operator.

5. The computing system according to claim 1, wherein the flight plan of one or more UAS can be modified according to one or more unexpected changes to a UAS power supply status, number of operational UASs, line of sight (LOS) between a UAS and its operator, condition of launch point, condition of landing point, or remote-control signal quality.

6. The computing system according to claim 1, wherein calculating said plurality of discrete geographic cells minimizes overall mission time.

7. The computing system according to claim 1, wherein each UAS only serves a single geographic cell.

8. The computing system according to claim 1, wherein different geographic cells are served sequentially by the fleet of UASs.

9. A computerized method for managing a fleet of Unmanned Aerial Systems (UASs) collaboratively performing a mission, the method comprising:
   (i) receiving mission requirements comprising mission goals, area of operation, and characteristics of each UAS comprising at least sensor types and constraints of each UAS, said UASs collaborating to work together as a single, coordinated system, each UAS performing a portion of said mission;
   (ii) calculating data acquisition points in said area of operation according to the mission goals, sensor types and constraints;
   (iii) calculating a plurality of discrete geographic cells to cover the data acquisition points, each geographic cell covering at least one data acquisition point and served by one or more UAS, wherein at least a portion of the cells are served in parallel by different UAS's and at least one cell is different in size and shape from the other cells;
   (iv) calculating a flight plan for each UAS, each flight plan comprising one or more routes and UAS speed values for each route or for each segment of a route;
   (v) for each calculated flight plan, assigning to each route or segment of a route a maximum position discrepancy tolerance value, said position discrepancy tolerance value being based on location and time discrepancies between the UAS expected position according to the flight plan and its actual position;
   (vi) verifying for each UAS, at predetermined intervals during flight, the UAS's aerial location at that time, wherein the flight plan of one or more UAS can be modified according to unexpected changes to the UAS's safe return to home (RTH) path because of unexpected conditions in the field;
   (vii) comparing each UAS's aerial location to an expected aerial location according to the flight plan at said time; and
   (viii) recalculating the flight plan of all the UASs of the fleet, if the discrepancy between the aerial location verified in (vi) and the expected aerial location according to the flight plan exceeds the assigned maximum position discrepancy tolerance value.

10. The computerized method according to claim 9, further comprising the step of verifying for each UAS at predetermined intervals during flight the UAS' power supply status.

11. The computerized method according to claim 9, further comprising the step of verifying for each UAS at predetermined intervals during flight the UAS' mission goals accomplishments status.

12. The computerized method according to claim 9, further comprising the step of verifying for each UAS at predetermined intervals during flight a signal quality from the UAS to an operator.

13. The computerized method according to claim 9, wherein the flight plan of one or more UAS can be modified according to one or more unexpected changes to a UAS power supply status, number of operational UAS, Line of Sight (LOS) between a UAS and its operator, condition of launch point, condition of landing point, or remote-control signal quality.

* * * * *